United States Patent [19]
Epifanidis

[11] Patent Number: 5,103,803
[45] Date of Patent: Apr. 14, 1992

[54] HEATING AND AIR CONDITIONING SOLAR HEAT ACCUMULATOR

[76] Inventor: Michael Epifanidis, P.O.B. 3884, 102 10 Athens, Greece

[21] Appl. No.: 605,700

[22] Filed: Oct. 29, 1990

[30] Foreign Application Priority Data
Aug. 6, 1990 [GR] Greece .......................... 900100590

[51] Int. Cl.⁵ .............................................. F24J 7/42
[52] U.S. Cl. .................................. 126/427; 126/428; 126/430
[58] Field of Search ................ 126/427, 428, 429, 430

[56] References Cited
U.S. PATENT DOCUMENTS 3,983,929 10/1976 Thomason et al. ............... 126/427
4,084,573 4/1978 Shubert .............................. 126/429
4,287,877 9/1981 Gaines ................................ 126/427
4,300,536 11/1981 Taschuk ............................. 126/428

*Primary Examiner*—Carroll B. Dority

[57] ABSTRACT

The invention relates to a solar accumulator, which is used to collect the sun rays to heat a heat conductive fluid medium contained within a piping system and an arrangement of plates—file bricks of high heat capacity. The heat produced is subsequently used to heat the air which is conveyed to the space to be heated. The air duct system employed making use of electrical relay controlled gates can alternatively be used for heating or air-conditioning/ventilating. Operation of the solar accumulator requires usage of an auxiliary or reserve energy source, e.g. electricity.

2 Claims, 3 Drawing Sheets

HEATING AND AIR CONDITIONING SOLAR HEAT ACCUMULATOR

THE FIELD OF THE INVENTION

This invention relates to a solar heat accumulator which makes use of solar energy and employs a heat transfer fluid medium to cover for the needs in heating and/or air-conditioning in a domestic or industrial scale.

THE PRIOR ART

Solar energy has been used from ancient times in a plurality of applications. Nowadays, the energy and environmental crisis increasingly leads to research and new developments in the field of solar energy and other renewable sources of energy.

However, much of the research that has been made so far has not led to compact units, which will be able, by using solar energy alone or solar in combination with other sources of energy, to cover for the heating and/or air-conditioning, domestic, commercial or industrial needs.

The problems of solar energy storage together with the variations in the availability of sunshine as well as the fact that often huge solar installations would be needed to cover for the needs, even in the case of domestic applications, have kept employment of solar energy at a low level.

SUMMARY OF THE INVENTION

The object of the invention is to provide ways and means in which solar energy may be advantageously exploited to cover for the heating and/or air-conditioning needs in domestic, commercial and industrial applications and in particular for heating and air-conditioning needs.

Another object of the invention is the employment of various designs of solar collection devices and the employment of those devices and the energy collected therefrom in combination with other sources of energy to provide adequate coverage for heating and air-conditioning needs in domestic commercial or industrial applications under any circumstances.

BRIEF DESCRIPTION OF THE DRAWINGS

The invention will be made apparent to those skilled in the art by reference to the accompanying drawings, which depict preferred, illustrative embodiments of the invention.

DETAILED DESCRIPTION OF THE INVENTION

Figure 1:
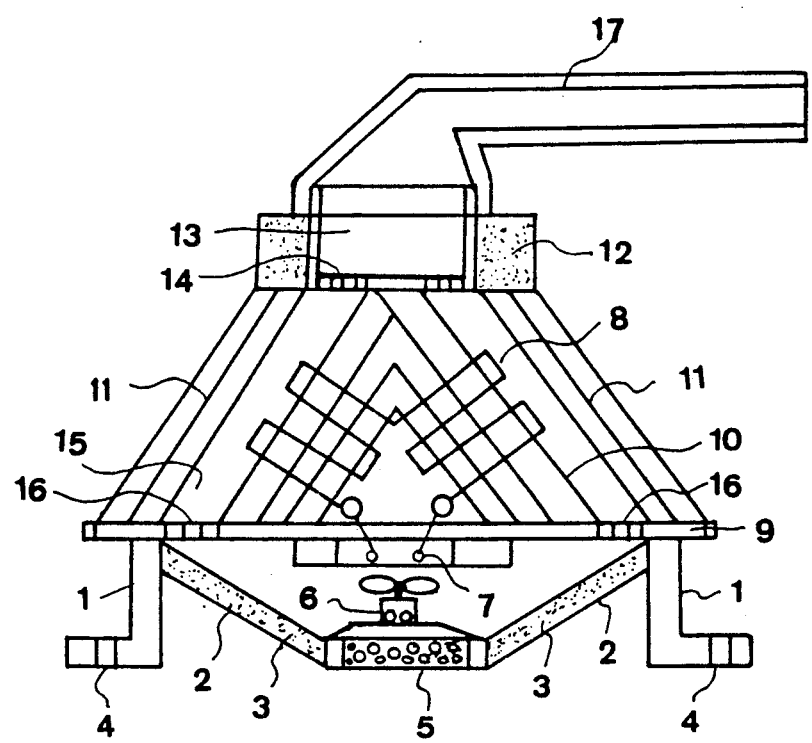
FIG. 1 shows a front view of a first preferred solar heat accumulator of the invention, where plates of a high heat capacity are used as the solar energy collection means, air ducts are used to convey heated air and electricity is used as an auxiliary or reserve energy source.
Figure 2:
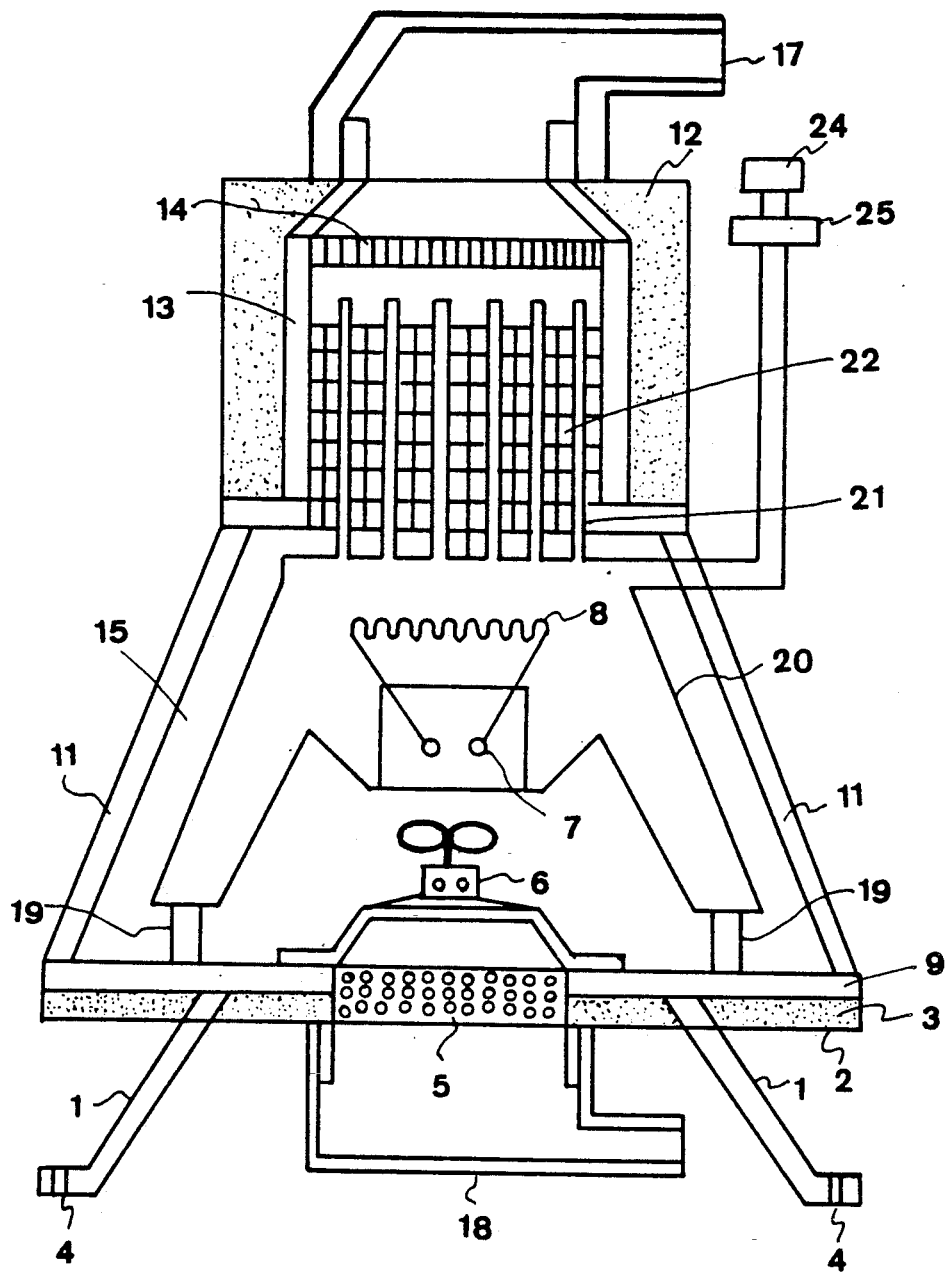
FIG. 2 shows a front view of a second preferred solar heat accumulator of the invention, where a fluid medium contained in a boiler combined with piping passing through an arrangement of file bricks are used as the solar energy collection means.
Figure 3:
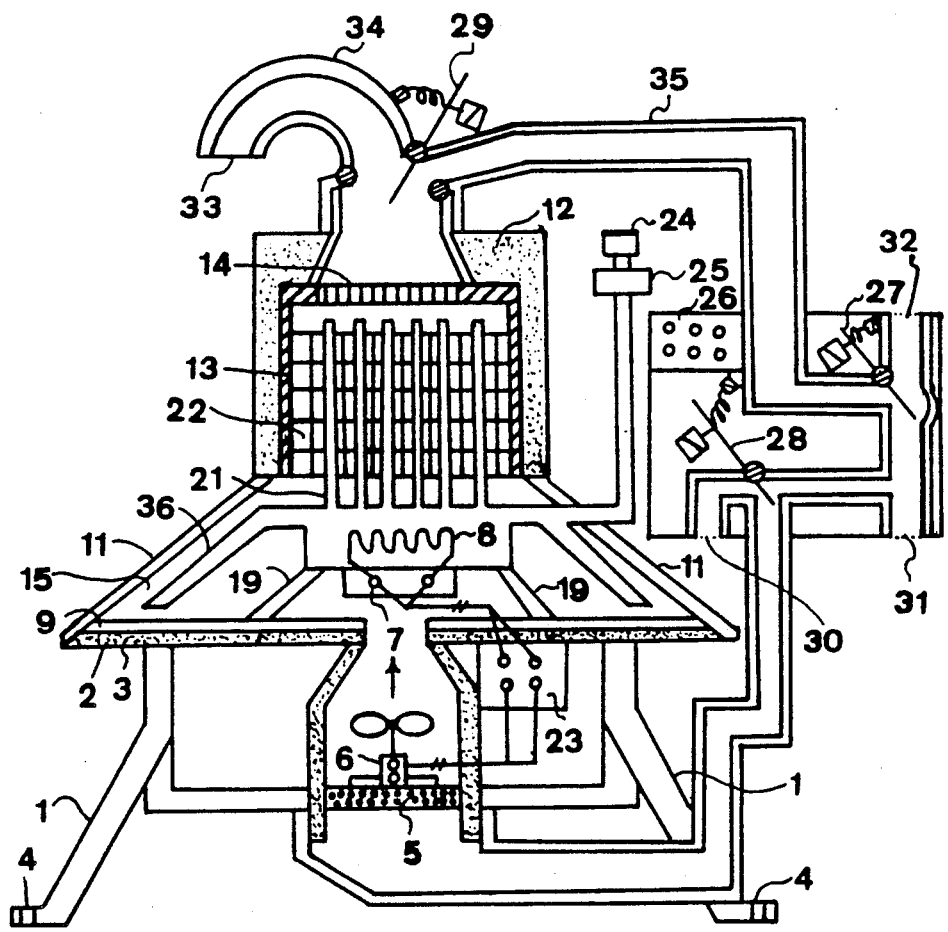
FIG. 3 shows a front view of a third preferred solar heat accumulator of the invention, where pipes, a portion of which passes through an arrangement of file bricks, are used as the solar energy collection means.

In the various illustrative embodiments of the heating and air-conditioning solar heat accumulator of the invention, the solar energy collection means can be the plates 10 of high heat capacity shown in FIG. 1, or the boiler 20 shown in FIG. 2 or the piping arrangement 36 of FIG. 3, whereas the heat transfer working medium can by way of example be distilled water or oil. The sun collection area is in any case covered by an arrangement of glass panels 11, where panels 11 can be single and preferably double or triple suitably spaced with intermediate vacuum for insulation purposes.

The piping 36 or boiler 20 are preferably painted black so as to achieve maximum absorption of sun rays. The fluid within piping 36 or boiler 20 flows upwards as it gets heated and enters into the overlying pipe coil 21, whereby heat is conducted to the arrangement of file bricks 22, which are preferably covered by a metallic foil 13 with an interior silver plated surface so as to minimize radiation losses. Another metallic housing 12 filled with insulating material, such as by way of example glass wool or other sufficiently insulating material surrounds the metallic foil covering 13, and aims to minimizing at the maximum possible degree thermal losses to the surroundings. The top surface of the metallic foil covering 13 is perforated with holes 14 through which passes the warm air to be supplied into the space to be heated via duct 17 as depicted in FIGS. 1 and 2.

As the file bricks 22 get heated, so does the air which is contained within the channels and holes formed by the file bricks, thereby rising upwards since it becomes lighter and can be conducted to the space which must be heated.

The bottom of the solar accumulator device of the invention may be flat as in FIGS. 2 and 3 or with downwards convergent walls as is the case in FIG. 1, or it may be of any other suitable and desired configuration. The bottom of the solar accumulator is made from metallic laminates 2 with an intermediate gap which is packed with an insulating material 3 in order to minimize thermal losses at the maximum possible degree.

The abovementioned bottom of the solar accumulator is connected to a suitable arrangement of supporting legs 1, which are provided with holes 4, via which bolts are passed to firmly mount the device onto the ground.

The circulation of air from the heating chamber within the solar accumulator to the space which has to be heated or air-conditioned takes place by means of either natural or forced convection, where in the latter case an electric fan 6 is employed by means of which circulation of hot air is implemented.

The air introduced into the heating chamber of the solar accumulator preferably passes through a filtering system 5 by means of which the air is cleaned and thereby is led to the space to be heated free of dust or other polluting ingredients.

The plates 10 of high heat capacity of the solar accumulator in FIG. 1 or the boiler 20 in FIG. 2 or the piping 36 of FIG. 3 are mounted either directly (FIG. 1) or via supporting legs 19 (FIGS. 2 and 3) onto a rectangular or of other desired configuration platform 9, whose shape and dimensions correspond to those of the overall basement of heating chamber.

In order to cover for the heating and/or air-conditioning needs in cases of insufficient sunshine, it is necessary to employ an auxiliary or reserve energy source, such as by way of example electricity, fuels, etc.

In order to keep down operational cost, the proposed solar accumulator may be combined and exploit already provided energy sources, such as by way of example the central heating installation of the building or a fireplace or the connection to a natural gas network, etc. By way of illustration, electricity is used as an auxiliary energy source and in particular an electric resistor 8 is shown, which may by way of example pass in a coil mode through heat conductive plates 10 of FIG. 1 or it may extend directly upwards a resistor box 7 as is the case in the solar accumulators of FIGS. 2 and 3. Both terminal leads of resistor 8 and fan 6 are connected into the connection box 26 depicted in FIG. 3. In order to keep operation costs to a minimum, operation of the electric resistors may take place during off-peak periods when the Electricity Board charges may be lower, and further their operation may be automatically controlled in correspondence to the changing weather conditions by means of thermostats and automatic operation regulating devices.

The air is introduced into the heating chamber of the solar accumulator of the invention, either directly from the surroundings or via a filter 5 (FIG. 1) or via an added independent duct 18 (FIG. 2) or directly from the space to be air-conditioned by means of a suitable ducting system. It is to be particularly noted that in the embodiment of FIG. 1, the air being introduced via filter 5 flows upwards into the heating chamber 15 through a suitable arrangement of holes 16 being provided onto frame 9.

Further, reference will be made in detail to the accompaying drawings, where in FIG. 1 there is depicted a first embodiment of the solar accumulator of the invention, where the air is heated when passing through and around the heat conductive plates 10, which are heated either by means of solar energy or by means of the electric resistor 8, thereby flowing upwards and being supplied to the space which has to be heated.

Another illustrative embodiment of the solar accumulator of the invention is depicted in FIG. 2, where the heat conductive medium is a fluid, by way of example distilled water or oil contained within a boiler 20 which extends to a top arrangement of pipes 21 which are located within an arrangement of file bricks 22. The heated air passes through file bricks 22 and is led via duct 17 to the space that has to be heated. In addition, FIG. 2 as well as FIG. 3 show a vertical pipe extension, being provided with a filling tap 24 by means of which the system is filled with the heat conductive fluid medium and a relief valve 25 which operates as a safety device in cases of possible overheating of the fluid.

A third illustrative embodiment of the solar accumulator of the invention is depicted in FIG. 3, which shows a pipe network 36 wherein circulation takes place of the heat conductive fluid medium and where in accordance to an illustrative, preferred embodiment of the invention a fireplace chimney 32 is used as part of the air duct system of the proposed solar accumulator.

Three gates 27, 28 and 29 each being controlled by an independent electrical relay and spring are used in the air duct system of the solar accumulator of FIG. 3.

A gate 27 with the corresponding relay allows, when open at a vertical position, usage of the chimney duct 32 for the vertical upward discharge of combustion gases of the operating fireplace to the surroundings.

When gate 27 assumes a horizontal position, the air discharged via duct 35 having been heated by the solar accumulator is supplied through the outlet 31 to the space to be heated.

The second gate 28, when the solar accumulator performs a heating operation, shuts off the air introduction duct from inlet 31. At the same time the third gate 29 shuts off the oulet duct 34, which is bent downwards in order to obstruct entrance of rain water into the system. Thus the air introduced cool through inlet 30 is heated and is subsequently supplied to the space to be heated via duct 35.

In accordance to a further preferred and illustrative embodiment of the invention, the same air duct system and solar accumulator of the invention may be used as a ventilating system for refreshing the air and air-conditioning the same space during summer. Such air-conditioning operation is performed as follows:

Gate 29 keeps the outlet towards duct 35 closed and allows discharge to the surroundings via outlet 33 of the bent duct 34. In the same time, gate 28 keeps the air inlet 30 to the solar accumulator shut and allows passage of air via duct 31 from the space whose air-conditioning is desired. The warm air supplied from the space to be air-conditioned flows upwards and is discharged from the outlet 35 of the bent duct 34, whereas it is automatically replaced with fresh air. Such air circulation for air-conditioning the desired space may be natural or forced by employing fan 6.

The entire air duct system may be contained within a suitable housing, within which a connection box 26 is provided, whereupon the terminal leads of the three electric relays 27, 28 and 29 are connected.

The solar accumulator may be made in various sizes and it is possible that the glass panels and the corresponding piping or otherwise the surface of the heat conductive plates which is disposed to the sun as well as the bottom metallic surface may comprise the roof of the building or a pavilion of the terrace, thereby leaving a space underneath which might be advantageously exploited by the proprietor.

The surfaces of the glass panels 11 as well as of piping 36 or of the boiler walls 20 containing the heat conductive fluid preferably have always the same inclination and form a pyramidal configuration with a polygonal or circular basement with a low height, such as to avoid formation of shades independently of the sun's position and thereby achieve a maximum exposure to the sun rays throughout the day. Piping 36 is preferably densely packed at a radial configuration around a central cylindrical liquid container.

It must hereby be noted that description of the present invention was made by reference to illustrative but non-confining embodiments. Thus any change or amendment in shape, sizes, types, means, materials and accessories used, as long as they do not comprise a new inventive step and do not contribute towards technical innovation, must be considered part of the scope and aims of the present invention.

What is claimed:

1. A heating system comprising: glass panels defining a pyramidal solar radiation receiving chamber, means forming a bottom of said chamber having an air inlet aperture, a boiler defining pipe network containing a heat conductive fluid medium being located within said solar radiation receiving chamber, said pipe network extending upward to an overlying piping arrangement, said overlying piping arrangement being located within an arrangement of heat storing file bricks, defining a rectangular structure with an air outlet aperture, gaps being left for the passage of air within said arrangement of heat storing file bricks, said arrangement of heat storing file bricks being covered by metallic foil with an inward silver plated surface, a metallic housing about said metallic foil with insulating material in between said metallic foil and said metallic housing, a fan beneath said air inlet aperture to force air through said air inlet aperture into said radiation receiving chamber, duct means for the introduction of air or combustion gases into said radiation receiving chamber and for discharging air or combustion gases from said radiation receiving chamber, a first spring and relay controlled gate valve means in said duct means for controlling the suction of air from the surroundings in one position or from within a building in another position, a second spring and relay controlled gate valve means in said duct means when in one position is adapted to control the discharge of combustion gases from a chimney of an operating fireplace to the surroundings and in another position is adapted to control the supply of combustion gases from the chimney of an operating fireplace to said fan to heat said boiler and heat storing file bricks, a third spring and relay controlled gate valve means in one position allowing discharge of combustion gases after passing over said boiler and file bricks to the surroundings and in another position shutting an outlet to the surroundings to allow passage of heated air through said duct means to a space to be heated when a heating operation is required, a resistor adapted to be supplied with electric current situated above said air inlet aperture and below said boiler defining pipe network to alternatively or additionally warm the air circulating through said radiation receiving chamber and water circulating through said boiler defining pipe network, said boiler defining pipe network being connected to means for the introduction of cold water.

2. A heating system comprising: glass panels defining a pyramidal solar radiation receiving chamber, means forming a bottom of said chamber having an air inlet aperture, a boiler defining pipe network containing a heat conductive fluid medium being located within said solar radiation receiving chamber, said pipe network extending upward to an overlying piping arrangement, said overlying piping arrangement being located within an arrangement of heat storing file bricks, defining a rectangular structure with an air outlet aperture, gaps being left for the passage of air within said arrangement of heat storing file bricks, said arrangement of heat storing file bricks being covered by metallic foil with an inward silver plated surface, a metallic housing about said metallic foil with insulating material in between said metallic foil and said metallic housing, a fan beneath said air inlet aperture to force air through said air inlet aperture into said radiation receiving chamber, duct means for the introduction of air into said radiation receiving chamber and for discharging air from said radiation receiving chamber, a first spring and relay controlled gate valve means in said duct means for controlling the suction of air from the surroundings in one position or from within a building in another position, a second spring and relay controlled gate valve means in said duct means when in one position is adapted to control the discharge of combustion gases from a chimney of an operating fireplace to the surroundings and in another position is adapted to control the supply of air heated within said radiation receiving chamber through the chimney of a non-operating fireplace to a space to be heated, a third spring and relay controlled gate valve means in one position allowing discharge of air supplied from within the building after passing over said boiler and file bricks to the surroundings when a ventilating operation is required and in another position shutting an outlet to the surroundings to allow passage of heated air through said duct means to a space to be heated when a heating operation is required, a resistor adapted to be supplied with electric current situated above said air inlet aperture and below said boiler defining pipe network to alternatively or additionally warm the air circulating through said radiation receiving chamber and water circulating through said boiler defining pipe network, said boiler defining pipe network being connected to means for the introduction of cold water.

* * * * *